Figure 1:
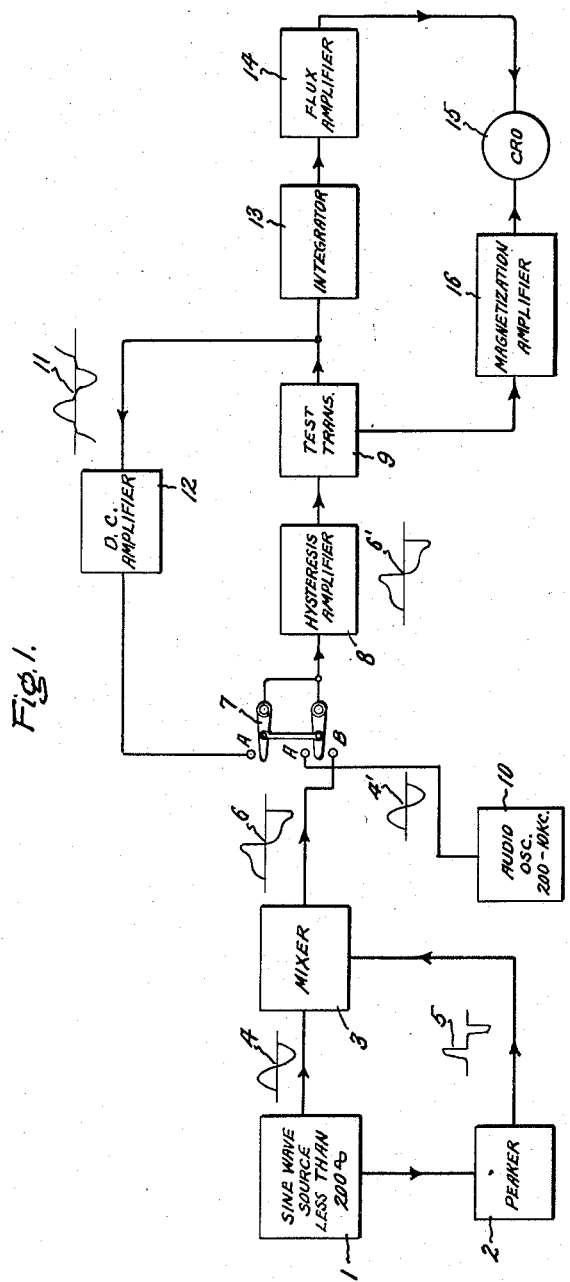

May 26, 1959  H. W. LORD  2,888,641
APPARATUS FOR MAGNETIC CORE TESTING
Filed May 13, 1954  2 Sheets-Sheet 1

INVENTOR.
Harold W. Lord,
BY
His Attorney.

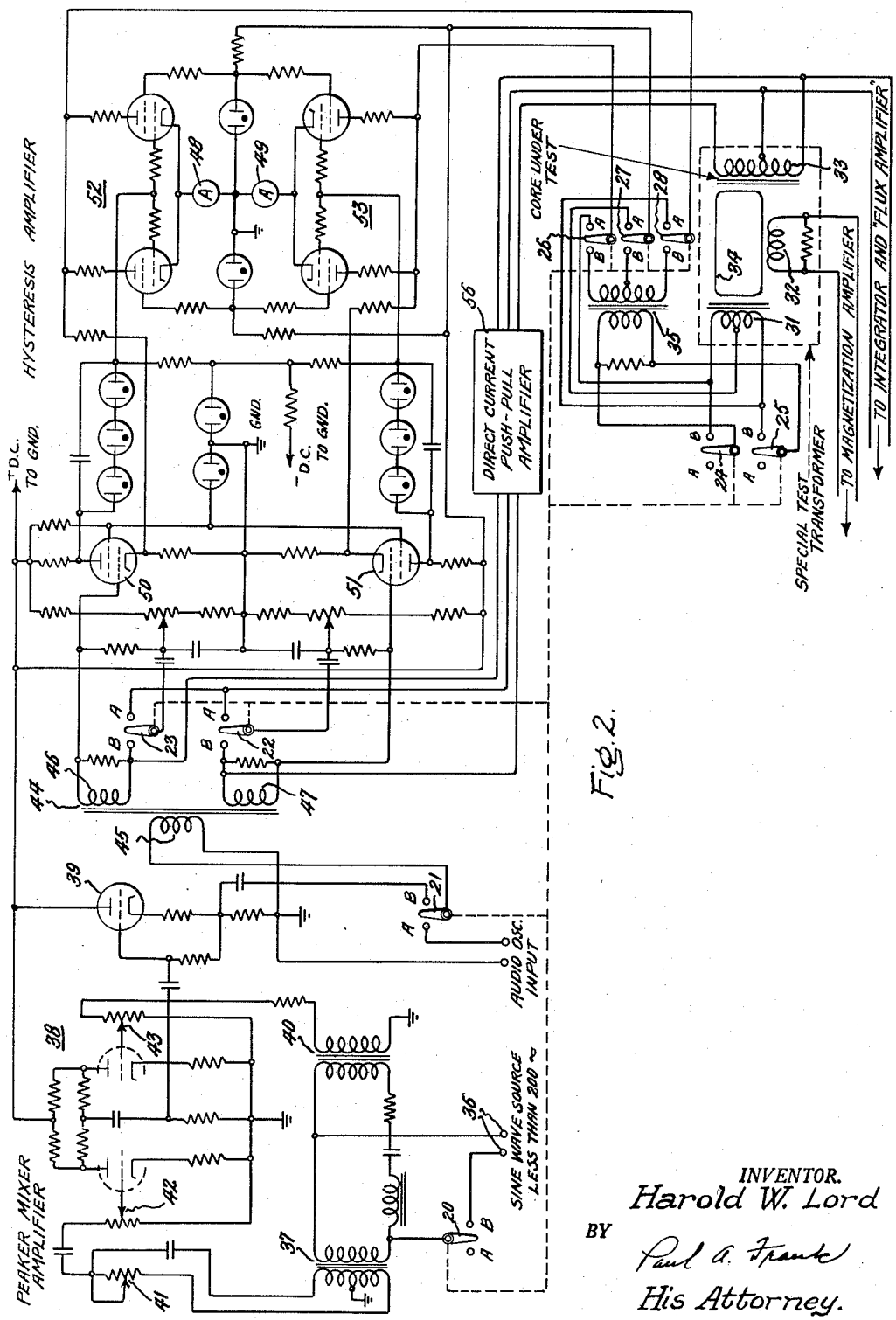

United States Patent Office 2,888,641
Patented May 26, 1959

2,888,641
APPARATUS FOR MAGNETIC CORE TESTING

Harold W. Lord, Schenectady, N.Y., assignor to General Electric Company, a corporation of New York Application May 13, 1954, Serial No. 429,539

5 Claims. (Cl. 324—34)

My invention relates to apparatus and methods of testing specimens of magnetic materials.

In order to provide a readily reproducible method for testing specimens of magnetic material, such as cores used in magnetic amplifiers, it is necessary to test them in a manner approximating their use in such amplifiers. As a matter of practice a sinusoidal flux wave has been considered most desirable. If the total harmonic distortion of the voltage induced by the flux wave is kept to less than ten percent, errors due to this distortion will be low enough to be tolerable. In those instances where the value of the peak exciting current exceeds the average value of exciting current by a factor in the order of two to three, the magnetic flux wave form in the test specimen will be sufficiently close to the wave form of the voltage applied to the exciting winding so that a satisfactory result is obtained by directly energizing the exciting winding from a sine wave generator. However, when testing specimens of material intended for use in magnetic amplifiers, where the peak exciting current exceeds the average current by a factor in the order of ten, considerable distortion takes place between the wave form of the voltage applied to the exciting windings and the flux wave in the test specimen.

It is an object of my invention to provide an improved method and apparatus for producing and maintaining a flux having a sinusoidal wave form in a specimen of magnetic material.

It is also an object of my invention to provide an improved method and apparatus for producing and maintaining a flux having a sinusoidal wave form in a specimen of magnetic material over a relatively wide frequency range where the peak amplitude of the exciting current is relatively high with respect to the average amplitude of the exciting current.

It is a further object of my invention to provide an improved method and apparatus for testing magnetic materials.

In accordance with my invention in its preferred form, I produce a magnetic flux having a sine wave form in a specimen of magnetic material by so distorting the wave form of the current flowing in the exciting windings of a test transformer that the desired flux wave form is obtained. In order to accomplish this result at relatively low frequencies I apply energy having a pre-distorted wave form through a linear amplifier to a test transformer. The wave form of the applied energy is properly distorted so that the resulting flux induced in the test specimen of magnetic material placed in the test transformer is substantially in the form of a sine wave. At higher frequencies I apply energy having a sine wave form through a linear amplifier to the test transformer. A flux sensitive coil is coupled to the specimen under test and the coil is coupled through a feed-back loop to the input of the linear amplifier in such phase as to correct any deviation of the flux wave form from the desired sine wave. A switching means is provided for selectively coupling either of the aforementioned energizing sources to the test transformer.

A better understanding of my invention may be obtained by referring to the following description taken in connection with the accompanying drawings in which Figure 1 is a block diagram of a complete magnetic material testing system incorporating my invention; and Figure 2 is a schematic diagram of a portion of the system illustrated in Figure 1.

A complete system for testing specimens of magnetic material is illustrated in block diagram form in Figure 1. This system consists of a sine wave source of energy 1 having a variable frequency ranging from approximately 0 to approximately 200 cycles per second. The output of this source is fed to a peaker amplifier 2 and the output of the peaker amplifier 2 is fed together with the output from sine wave source 1 into mixer 3. The approximate output wave forms of the sine wave source 1 and the peaker amplifier 2 are illustrated by curves 4 and 5 respectively. The output of sine wave source 1 and peaker 2 are so phased and of such relative amplitude that the output signal of mixer 3 has a wave form similar to that shown by curve 6. With gang switch 7 in position "B" the output of mixer 3 is fed through hysteresis amplifier 8 to the energizing coil of test transformer 9. When gang switch 7 is in the "A" position the output from audio oscillator 10 is applied directly to hysteresis amplifier 8 and the energizing coil of test transformer 9. The flux sensitive coil in test transformer 9 provides a feed-back signal having a wave form corresponding to the flux in the test specimen and which may have a wave form similar to that shown by curve 11. This feed-back signal is amplified by direct current amplifier 12 and applied to the input of hysteresis amplifier 8 in such phase as to cause flux having a substantially sinusoidal wave form to be induced in the test specimen.

The output of the flux sensitive coil of test transformer 9 is fed through time integrator 13 and flux amplifier 14 to the vertical plates of cathode ray oscilloscope 15. Test transformer 9 is provided with a current coil the voltage across which is proportional to the magnetomotive force applied to the test specimen. The output of this current transformer is amplified by magnetization amplifier 16 and the output of this amplifier is applied to the horizontal deflecting plates of cathode ray oscilloscope 15. In this fashion, a dynamic hysteresis curve of flux as a function of magnetomotive force may be produced on the cathode ray oscilloscope 15.

It will be noted that curves 4, 4', 5, 6 and 6' are voltage curves. Curve 11 is illustrative of the shape of the inducted voltage in the pickup coil. This induced voltage is proportional to the rate of change of flux in the specimen contained in test transformer 9. It will be noted that curve 11 indicates that the wave form of the flux in the test specimen is not a true sine wave and that it is distorted by approximately six to ten percent. Curve 6' illustrates the resulting voltage wave of the energy applied to the test transformer when a corrective signal is fed by direct current amplifier 12 into the input of hysteresis amplifier 8. Curve 6' also illustrates the approximate wave form of the output of hysteresis amplifier 8 when a signal is fed directly from mixer 3 into hysteresis amplifier 8 without the feed-back coupling through amplifier 12. It will be noted that the peak of voltage wave forms 6 and 6' correspond in time with the flat portion of wave form 11 so that when energy, having a wave form corresponding with that illustrated by curve 6', is applied to the energizing coil of test transformer 9, a substantially sinusoidal wave form of flux will result.

A more complete understanding of my invention may be had by referring to Figures 1 and 2. Figure 2 illustrates by means of a schematic circuit diagram the peaker-mixer-amplifier, the hysteresis amplifier and the test transformer of the complete system illustrated in Figure 1. It should be noted at this point, that the testing frequency ranges specifically recited in the description of Figure 1 of the drawing are given merely by way of example and are not to be considered limiting. It is noted, however, that when the test frequency exceeds approximately 200 cycles it is more convenient to utilize an apparatus which continually corrects the wave shape of the energy applied to the test transformer. Below 200 cycles the available feed-back voltage from the flux sensitive coil test transformer 9 is generally too low for proper compensation. Therefore, applicant's test apparatus uses energy having a pre-distorted wave form for frequencies below 200 cycles and constantly and automatically corrects the wave form of the applied energy above 200 cycles.

Switches 20 through 28 are mechanically interconnected and correspond to the switches 7 in Figure 1. The test transformer consists of a primary energizing coil 31, a current transformer 32 and a flux sensitive pick-up coil 33. Loop 34 is the secondary of energizing coil 31, the primary of current transformer 32 and energizes the specimen of magnetic material being tested. This test transformer in a preferred form is more completely described and is claimed in applicant's United States patent application Serial No. 429,540, filed concurrently herewith and assigned to the same assignee as the application, now Patent No. 2,829,338.

Matching transformer 35 is provided to match the output impedance of the hysteresis amplifier to the input impedance of the test transformer when operating in the lower frequency range. Switches 24, 25, 26, 27 and 28 provide the means of coupling impedance matching transformer 35 to the test transformer. The output of current transformer 32 corresponds to the magnetizing force applied to the core under test and is applied through the magnetization ray amplifier to the horizontal plates of the cathode ray oscilloscope 15 of Figure 1. The output of flux sensitive coil 33, which corresponds to the rate of change of flux in the test specimen is applied through integrator 13 to provide a voltage proportional to the flux in the core under test. The output of flux amplifier 14 is then applied to the vertical plates of the cathode ray oscilloscope 15.

Referring now to the left-hand portion of the schematic circuit of Figure 2 the operation of applicant's system in the low frequency range will now be described. For low frequency operation the mechanically interconnected switches are placed in the "B" position. The sine wave source of energy is applied to terminals 36, peaker transformer 40, and into the peaker amplifier 38. The peaker amplifier 38 consists of the right hand half of the dual triode. The output of the peaker amplifier is then applied to mixer amplifier tube 39. Energy from the sine wave source is applied through transformer 37, the left hand half of the dual-triode, and then to mixer amplifier tube 39. The phase relationship between the sine wave energy and the peaked wave energy as well as their respective amplitudes determine the voltage wave shape of the output of the mixer amplifier. The phase and amplitude relationships are determined by the relative values of the circuit components and may be varied by adjusting variable potentiometers 41, 42 and 43.

The output of mixer 39 is applied to push-pull transformer 44 consisting of primary coil 45 and push-pull secondaries 46 and 47. The hysteresis amplifier is essentially a linear push-pull amplifier. Ammeters 48 and 49 are placed in the circuit to assist in balancing the output of the amplifier. The distorted signal from mixer 39 is fed along the respective push-pull channels in the hysteresis amplifier, through tetrode amplifiers 50 and 51 to balanced output stages 52 and 53. The resulting distorted signal is applied through impedance matching transformer 35 to the energizing coil 31 of the test transformer.

At frequencies above 200 cycles per second the gang switches are placed in the "A" position and energy having a substantially pure sine wave form is applied to transformer 44 of the hysteresis amplifier. For the purposes of this explanation it will be assumed that energy having a substantially pure sine wave passes completely through the system and that a correcting voltage is thereby generated which, when reintroduced into the amplifier input stage, results in energy having the wave form which is actually applied to energizing coil 31 of the test transformer. The applied sine wave signal travels along the push-pull channels from transformer secondaries 46 and 47 through push-pull amplifier tubes 50 and 51, and thence to balanced output stages 52 and 53. The output of hysteresis amplifier is then applied directly to coil 31 of the special test transformer. Coil 31 causes a current to flow in loop 34. The current flowing in loop 34 induces a flux in the core under test and this induced flux induces a voltage in flux sensitive coil 33 which has a wave shape which is proportional to the rate of change of flux in the test specimen. The output of flux sensitive coil 33 is applied through direct current push-pull amplifier 56 to the push-pull inputs of tubes 50 and 51. The output of push-pull direct current amplifier 56 is connected in series subtracting relation to the applied sine wave signal from the audio oscillator.

The wave shape of the output of the direct current push-pull amplifier 56 has a form substantially the same as curve 11 which is shown in Figure 1 of the drawing. The applied signal from direct current push-pull amplifier 56 distorts the signal in hysteresis amplifier so that energy, having a wave form approximating that illustrated by curve 6' in Figure 1 of the drawing, is applied to energizing coil 31. In this manner, successive corrections will be made to the applied energy so that a substantially pure sine wave of flux is produced in the specimen or core under test.

It should be noted that distortion of the flux wave form is caused by the current having a distorted wave form which flows through the series impedances of the hysteresis amplifier, the loading effects of the current carrying loop 34 and the impedance effect of other circuit components. The principal cause of distortion is the large IR drop in single turn loop 34 which is reflected back into the output of the amplifier as a series impedance.

The hysteresis amplifier of my invention utilizes approximately 10 decibels of inverse feedback in order to provide a low effective plate impedance for the output stages 52 and 53. Approximately 16 decibels of inverse feedback is taken from the flux sensitive winding 33 coupled to the core under test. By using this particular design of a hysteresis amplifier in accordance with my invention the harmonic distortion in the voltage induced in coil 33 does not exceed six percent. At frequencies below 200 cycles the harmonic distortion in coil 33 tends to increase rapidly since the voltage required to excite the test core becomes so low that the error signal in the feedback loop even when an amplifier is used is insufficient to keep the distortion low. Therefore, for frequencies below approximately 200 cycles it is desirable to use a pre-distorted signal such as may be obtained by mixing a peaked signal and a pure sine wave signal in the peaker-mixer-amplifier of my invention. It is noted, that for this particular embodiment of my invention, the energy having the peaked wave is phased so that the peak occurs nearly ninety degrees after the peak of the sine wave and in this fashion energy having a distorted wave such as illustrated by curve 6 of Figure 1 is obtained.

When operating below approximately 200 cycles per second the proper values of each particular wave form are set in the following manner. With a zero component of peaked excitation the sine wave excitation is brought up until the oscilloscope displaying the hysteresis loop shows the core flux is swinging from "knee" to "knee." With the sine wave component left at this value, the peaked wave component is increased until the required value of exciting current peaks are reached. This is apparent when there is obtained on the oscilloscope a clear hysteresis loop trace without any portions of the trace intersecting. If the peaked wave is sufficiently narrow and therefore has a sufficiently high harmonic content and a low fundamental frequency component, the harmonic content in the flux sensitive coil 33 will be less than six percent.

I have described my invention in connection with a preferred embodiment. It will be understood by those skilled in the art that my invention may take a variety of forms and that the specific apparatus and method herein described are given merely by way of example.

What I claim as new and desire to secure by Letters Patent of the United States is:

1. Apparatus for producing a sine wave of magnetic flux in a specimen of magnetic material comprising a source of energy having a sinusoidal wave shape, wave shaping means, means for applying said energy to said wave shaping means, a mixer coupled to said source and the output of said wave shaping means, means for applying the output of said mixer to energizing means coupled to said specimen to produce a substantially sinusoidal flux in said specimen.

2. Apparatus for producing a sine wave of magnetic flux in a specimen of magnetic material comprising a source of energy having a sinusoidal voltage wave shape, wave shaping means, means for applying said energy to said wave shaping means, a mixer, means coupling said source and the output of said wave shaping means in proper phase and amplitude to said mixer so that a substantially sinusoidal flux will be produced in said specimen when the output of said mixer is applied to an energizing means coupled to said specimen.

3. Apparatus for producing a substantially sinusoidal wave of flux in a specimen of magnetic material comprising inductive means for coupling to the specimen, a circuit connected to energize said inductive means including a plurality of sources of alternating voltages of different wave shapes and independent of the specimen, means for combining said voltage sources to produce a cyclically varying voltage energizing said inductive means and having the wave shape to produce a sinusoidal flux variation in the specimen.

4. Apparatus for producing a substantially sinusoidal wave of flux in a specimen of magnetic material comprising inductive means for coupling to the specimen, a circuit connected to energize said inductive means, a source of substantially sinusoidally varying voltage, a second source of cyclically varying voltage independent of the specimen and having a substantial harmonic content, means for combining the voltages of said sources and impressing the resultant voltage on said circuit to produce a voltage energizing said inductive means having a wave shape to produce a sinusoidal flux variation in the specimen.

5. Apparatus for producing a substantially sinusoidal wave of flux in a specimen of magnetic material over a range of frequencies comprising inductive means for coupling to the specimen, a circuit connected to energize said inductive means, a first energizing circuit for said circuit including a source of alternating current voltage variable over a first portion of said range of frequencies, a source of voltage of high harmonic content having the same frequency of cyclic variation as said first source and means for combining said voltage sources to produce a cyclically varying voltage having the wave shape to produce a sinusoidal flux variation in the specimen, a second energizing circuit for said circuit including a source of alternating voltage variable over a second portion of said range of frequencies and means responsive to the flux produced in a specimen coupled to said inductive means for modifying the voltage of said second source to produce a wave shape of voltage tending to produce sinusoidal flux variation in the specimen and means selectively connecting said first and second energizing circuits to said inductive means to produce a substantially sinusoidal flux variation in the specimen over the said range of frequencies.

References Cited in the file of this patent

UNITED STATES PATENTS

| | | |
|---|---|---|
| 1,743,087 | Kinsley | Jan. 7, 1930 |
| 2,023,228 | Hermann | Dec. 3, 1935 |
| 2,134,539 | Thal | Oct. 25, 1938 |
| 2,176,279 | Shenk | Oct. 17, 1939 |